United States Patent
Baldemair et al.

(10) Patent No.: US 12,362,979 B2
(45) Date of Patent: *Jul. 15, 2025

(54) COMMON REFERENCE SIGNAL DESIGN FOR OFDM AND DFTS-OFDM

(71) Applicant: Telefonaktiebolaget LM Ericsson (publ), Stockholm (SE)

(72) Inventors: Robert Baldemair, Solna (SE); ERik Dahlman, Stockholm (SE); Lars Lindbom, Karlstad (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 13 days.

This patent is subject to a terminal disclaimer.

(21) Appl. No.: 18/333,288

(22) Filed: Jun. 12, 2023

(65) Prior Publication Data
US 2023/0344696 A1 Oct. 26, 2023

Related U.S. Application Data

(63) Continuation of application No. 16/523,274, filed on Jul. 26, 2019, now Pat. No. 11,706,073, which is a
(Continued)

(51) Int. Cl.
*H04L 27/26* (2006.01)
*H04L 5/00* (2006.01)

(52) U.S. Cl.
CPC ........ *H04L 27/2636* (2013.01); *H04L 5/0048* (2013.01)

(58) Field of Classification Search
None
See application file for complete search history.

(56) References Cited

U.S. PATENT DOCUMENTS

| 2008/0139237 A1 | 6/2008 | Papasakellariou |
| 2012/0106489 A1 | 5/2012 | Konishi et al. |

(Continued)

FOREIGN PATENT DOCUMENTS

| CN | 101741793 A | 6/2010 |
| CN | 104798334 A | 7/2015 |

(Continued)

OTHER PUBLICATIONS

Berardinelli, OFDMA vs. SC-FDMA: performance comparison in local area IMT-A scenarios, Oct. 2008, IEEE, 1536-1284/08, pp. 64-72 (Year: 2008).*

(Continued)

*Primary Examiner* — Kouroush Mohebbi
(74) *Attorney, Agent, or Firm* — Murphy, Bilak & Homiller, PLLC

(57) ABSTRACT

The present disclosure pertains to a terminal for a Radio Access Network, the terminal being adapted for transmission based on a first frequency division multiple access (FDMA) technology and for transmission based on a second frequency division multiple access technology. The terminal is adapted for transmitting reference signaling having a comb structure for transmission based on either the first FDMA technology or the second FDMA technology. The disclosure also pertains to related devices and methods.

18 Claims, 9 Drawing Sheets

Related U.S. Application Data continuation of application No. 16/379,292, filed on Apr. 9, 2019, now Pat. No. 10,700,908, which is a continuation of application No. PCT/EP2016/074249, filed on Oct. 10, 2016.

(56) References Cited

U.S. PATENT DOCUMENTS

| | | | |
|---|---|---|---|
| 2015/0222404 | A1 | 8/2015 | Jeong et al. |
| 2017/0353257 | A1* | 12/2017 | Islam ................. H04L 27/2657 |
| 2018/0123654 | A1* | 5/2018 | Park ..................... H04B 7/0626 |

FOREIGN PATENT DOCUMENTS

| | | |
|---|---|---|
| EP | 3516811 A1 | 7/2019 |
| WO | 2018057183 A1 | 3/2018 |

OTHER PUBLICATIONS

Berardinelli, Gilberto, et al., "OFDMA vs. SC-FDMA: Performance Comparison in Local Area IMT-A Scenarios", Recent Advances and Evolution of WLAN and WMAN Standards, Oct. 2008, 1-9.

Unknown, Author, "3rd Generation Partnership Project; Technical Specification Group Radio Access Network; Evolved Universal Terrestrial Radio Access (E-UTRA); Physical channels and modulation (Release 14)", 3GPP TS 36.211 V14.0.0, Sep. 2016, 1-170.

Unknown, Author, "Coexistence of CP OFDM and CP DFT-s-OFDM for NR UL", 3GPP TSG RAN WGI Meeting #86bis, R1-1609887, Lisbon, Portugal, Oct. 10-14, 2016, 1-4.

Unknown, Author, "UL reference signal design for eMBB with CP-OFDM and DFT-s-OFDM", 3GPP TSG-RAN WG1 #86, R1-1610115, Lisbon, Portugal, Oct. 10-14, 2016, 1-3.

* cited by examiner

COMMON REFERENCE SIGNAL DESIGN FOR OFDM AND DFTS-OFDM

TECHNICAL FIELD

The present disclosure pertains to wireless communication technology, in particular to reference signaling.

BACKGROUND

LTE uses Orthogonal Frequency-Division Multiplexing (OFDM) in the DL (downlink) and discrete-Fourier-Transform-Spread OFDM (DFTS-OFDM) in the UL (uplink). The two different link directions use different transmissions schemes or frequency-division multiple access (FDM) technologies. In general, DL and UL are quite different in LTE, which is shorthand for Long-Term Evolution, a 3GPP telecommunications standard. In the standardization of the $5^{th}$-Generation (5G) standard known as NR, or "New Radio," it is currently discussed to include both OFDM and DFTS-OFDM in the UL. Using different FDMs may lead to issues in particular regarding reference signals.

SUMMARY

It is an object of the present disclosure to provide approaches to improve reference signaling for future systems, in particular in the context of a wireless communication system allowing two different FDM/FDMA technologies to be used for uplink and/or sidelink communications. Several approaches are discussed, which may be individually implemented, or combined as appropriate.

Generally, in the context of this disclosure, a first frequency division multiple access technology (FDMA) may be and/or comprise and/or be based on multi-carrier FDMA, e.g. based on OFDM or filterbank Multi-Carrier (FBMC). A second FDMA technology may be and/or comprise and/or be based on precoded or spreading FDMA, e.g., based on DFTS-OFDM (or single-carrier frequency-division multiple access, SC-FDMA) or filterbank-precoded or filterbank-spreaded FBMC. The second FDMA technology may generally be multi-carrier or single-carrier based.

Also, in the context of this disclosure, transmission from a terminal may be considered to be in uplink (in the direction to the network or a network node, in particular to a radio access node of the network, and/or to a higher layer of the network), or in sidelink. Sidelink may pertain to (e.g., direct, and/or without being routed via a radio access node or network and/or core network) transmission to another terminal, e.g. in D2D (device-to-device) and/or V2x (Vehicular to x, x indicating Infrastructure, Pedestrian or Vehicular). For 3GPP/LTE, D2D may be implemented as ProSe (Proximity Services) functionality. A comb structure, or short comb, may indicate a periodic arrangement of a pattern of signals, in particular in frequency space, between an upper and lower frequency, and/or may pertain to one FDMA symbol and/or one (the same) symbol time interval.

The pattern may comprise at least one reference signal, and may optionally comprise one or more data signals and/or empty signals. The pattern may define a width (N), which may indicate a number of resource elements and/or subcarriers in the pattern, and/or the number of resource elements and/or subcarriers until the pattern repeats. For a pattern covering only on reference signal, N−1 indicated the number of resource elements and/or subcarriers between reference signals. The comb structure may indicate an offset, indicating the relative shift of the patterns in the frequency range and/or where the pattern begins.

There is disclosed a first approach pertaining to a terminal for a Radio Access Network. The terminal may be adapted for, and/or comprise a first transmitting module for, transmission based on a first frequency division multiple access, FDMA, technology and for transmission based on a second frequency division multiple access technology, for which it may comprise a second transmitting module. The terminal is adapted for transmitting reference signaling having a comb structure for transmission based on either, or either of, the first FDMA technology or the second FDMA technology. Thus, regardless of whether the terminal transmits utilising the first FDMA or the second FDMA, or in some cases even both, reference signaling has a comb structure. Accordingly, the same (general or specific) structure for reference signaling may be used for different FDMAs, providing symmetry and improving handling in particular in the context of sidelink transmissions. It should be noted that different comb structures may be used for different FDMAs (or, for different situations), as long a comb structure is used for each FDMA reference signaling.

A method for operating a terminal in a Radio Access Network is disclosed in the context of this approach. The terminal is adapted for transmission based on a first frequency division multiple access, FDMA, technology and for transmission based on a second frequency division multiple access technology. The method comprises transmitting reference signaling having a comb structure for transmission based on either the first FDMA technology or the second FDMA technology.

In a second approach, a terminal for a Radio Access Network may be considered, which may be a terminal according to the first approach. The terminal is adapted for, and/or may comprise a first transmitting module for, transmission based on a first frequency division multiple access, FDMA, technology which is a multi-carrier FDMA technology. In particular, the terminal, for transmission based on the first FDMA technology, is adapted for transmitting reference signaling having a comb structure. Thus, multi-carrier FDMA reference signaling has a comb structure, which provides a reliable and easy handling of reference signaling.

In the context of this approach, a method for operating a terminal in a Radio Access Network is disclosed, which may be a method according to the first approach. The terminal is adapted for transmission based on a first frequency division multiple access, FDMA, technology which is a multi-carrier FDMA technology, the method comprising transmitting reference signaling having a comb structure for transmission based on the first FDMA technology.

For a third approach, a terminal for a Radio Access Network is proposed, which may be a terminal according to the first approach and/or the second approach. The terminal is adapted for, and/or may comprise a first transmitting module for, transmission based on a first frequency division multiple access, FDMA, technology and/or for transmission based on a second frequency division multiple access technology, for which it may comprise a second transmitting module. Moreover, the terminal is adapted for transmitting reference signaling having a comb structure based on a combination of comb structures when transmitting the reference signaling for transmission based on the first FDMA technology and/or the second FDMA technology. With the combination of comb structures, the reference signaling density in the structure may be adapted, in particular increased.

In the context of this approach, a method for operating a terminal in a Radio Access Network is described, which may be a method according to the first approach and/or the second approach. The terminal being adapted for transmission based on a first frequency division multiple access, FDMA, technology and/or for transmission based on a second frequency division multiple access technology, the method comprising transmitting reference signaling having a comb structure based on a combination of comb structures when transmitting the reference signaling for transmission based on the first FDMA technology and/or the second FDMA technology.

Generally, any of the terminals disclosed herein may be adapted for transmitting data inside the comb structure when transmitting the reference signaling based on the first FDMA technology. Accordingly, the data transmission rate may be increased, in particular in the context of multi-carrier FDMA like OFDMA. The first transmitting module may be adapted accordingly. Any of the methods for operating a terminal described herein may comprise transmitting data inside the comb structure when transmitting the reference signaling based on the first FDMA technology. It may be considered that the terminal is adapted for transmitting the reference signaling based on the second FDMA technology without data signals in the comb structure, and/or such that resource elements between the reference signals of the comb structure are empty and/or do not carry signals. The method may comprise such transmitting. The comb structure may be determined and/or adapted and/or selected to include one or more data signals for such transmitting of reference signaling.

There may be considered a fourth approach for a terminal for a Radio Access Network, which may be a terminal according to the first and/or second and/or third approach. The terminal is adapted for, and/or comprise a first transmitting module for, transmission based on a first frequency division multiple access, FDMA, technology and/or for transmission based on a second frequency division multiple access technology, for which it may comprise a second transmitting module. The terminal is adapted for transmitting a reference signaling indication indicating the reference signaling structure used for transmission of signaling based on the first FDMA technology and/or the second FDMA technology. Thus, the terminal may indicate to another terminal and/or a network node which reference signaling structure it utilises, thus allowing the receiving device/s to adapt accordingly, e.g. avoiding the necessity of blind detection for the receiving device and/or facilitating easy demodulation.

Also in the context of this approach, there is considered a method for operating a terminal in a Radio Access Network, which may be a method according the first approach and/or the second approach and/or the third approach and/or comprise transmitting data inside the comb structure as described herein. The terminal being adapted for transmission based on a first frequency division multiple access, FDMA, technology and/or for transmission based on a second frequency division multiple access technology, the method comprising transmitting a reference signaling indication indicating the reference signaling structure used for transmission of signaling based on the first FDMA technology and/or the second FDMA technology. A reference signaling indication may be any indication and/or signal based on which a terminal may determine which reference signaling structure and/or FDMA technology to use for transmission. Such an indication may comprise one or more bits and/or flags. The indication may be implicit (e.g., based on a criterium based on which a FDMA technology is selected) and/or explicit, e.g, with one or more dedicated parameters in control information, e.g., downlink control information or DCI.

It may generally be considered that a terminal (which may be a terminal according to any of the approaches described herein) is adapted for, and/or that a method for operating a terminal (which may be a method according to any of the approaches described herein) comprises, selecting between the first FDMA technology and the second FDMA technology, e.g. for transmitting reference signaling and/or for transmission. The terminal may comprise a corresponding selecting module.

In a fifth approach, there is disclosed a network node for a Radio Access Network. The network node is adapted for, and/or may comprise a first receiving module for, reception based on a first frequency division multiple access, FDMA, technology. The network node is also adapted for reception based on a second frequency division multiple access technology, for which it may comprise a second receiving module. For reception based on either, or either of, the first FDMA technology or the second FDMA technology, the network node is adapted for, and/or may comprise a processing module for, demodulating and/or decoding of received signaling based on a reference signaling structure being a comb structure. The network node thus may utilize similar assumptions for demodulating and/or decoding of reference signaling, independent of which FDMA is used, as the reference signaling structures at least are similar to each other.

In the context of this approach, there is disclosed a method for operating a network node in a Radio Access Network. The network node is adapted for reception based on a first frequency division multiple access, FDMA, technology and for reception based on a second frequency division multiple access technology. The method comprises, for reception based on either, and/or either of, the first FDMA technology or the second FDMA technology, demodulating and/or decoding of received signaling based on a reference signaling structure being a comb structure.

According to a sixth approach, there is disclosed a network node for a Radio Access Network, which may be a network node according to the fifth approach. The network node is adapted for, and/or may comprise a first receiving module for, reception based on a first frequency division multiple access, FDMA, technology which is a multi-carrier FDMA technology. The network node is adapted for, and/or may comprise a processing module for, demodulating and/or decoding of received signaling based on a reference signaling structure which is a comb structure, in particular for reception based on the first FDMA technology. The network node thus may use (assume) an advantageous, simple and reliable structure of reference signaling.

In the context of this approach, there is discussed a method for operating a network node in a Radio Access Network, which may be a method according to the fifth approach. The network node is adapted for reception based on a first frequency division multiple access, FDMA, technology, which is a multi-carrier FDMA technology. The method comprises demodulating and/or decoding of received signaling based on a reference signaling structure which is a comb structure.

According to a seventh approach, there is disclosed a network node for a Radio Access Network, which may be a network node according to the fifth and/or sixth approach. The network node is adapted for, and/or may comprise a first receiving module for, reception based on a first frequency division multiple access, FDMA, technology. The network node may alternatively or additionally be adapted for, and/or comprise a second receiving module for, reception based on a second frequency division multiple access technology. The network node is adapted for, and/or may comprise a processing module for, demodulating and/or decoding of received signaling based on a reference signaling structure being a comb structure based on a combination of comb structures for reception based on the first FDMA and/or the second FDMA technology.

There is described a method for operating a network node in a Radio Access Network in the context of this approach, which may be a method according to the fifth and/or sixth approach. The network node is adapted for reception based on a first frequency division multiple access, FDMA, technology and/or for reception based on a second frequency division multiple access technology. The method comprising demodulating and/or decoding of received signaling based on a reference signaling structure being a comb structure based on a combination of comb structures for reception based on the first FDMA and/or the second FDMA.

There may generally be considered a network node according to any of the approaches described herein. The network node is further adapted for, and/or the processing module is adapted for, demodulating and/or decoding of received signaling based on a reference signaling structure comprising data inside the comb structure for reception based on the first FDMA technology. In this context, there is described a method for operating a network node, which may be a method for operating a network node according to any of the approaches described herein. The method comprises, for reception based on the first FDMA technology, demodulating and/or decoding of received signaling based on a reference signaling structure comprising data inside the comb structure.

According to an eight approach, there is disclosed a network node for a Radio Access Network, which may be a network node according to the fifth and/or sixth and/or seventh approach. The network node is adapted for, and/or comprises a first receiving module for, reception based on a first frequency division multiple access, FDMA, technology. Alternatively or additionally, the network node may be adapted for, and/or comprise a second receiving module for, reception based on a second frequency division multiple access technology. The network node is adapted for, and/or comprises a processing module for, demodulating and/or decoding of received signaling based on a received reference signaling indication indicating the reference signaling structure used for the received signaling.

Demodulating and/or decoding of received signaling based on a reference signaling structure may generally refer to utilising the structure and/or an assumption that the structure underlies the received signaling and/or associated reference signaling for demodulating and/or decoding (e.g., for error detection coding and/or forward error coding). The signaling may comprise the reference signaling, but may also comprise additional signaling (e.g., data signaling), which for example may be received later than reference signaling (e.g., in following symbol times, e.g. of a slot or subframe or mini-slot).

There may be considered in the context of this approach, a method for operating a network node in a Radio Access Network, which may be a method according to the fifth and/or sixth and/or seventh approach. The network node is adapted for reception based on a first frequency division multiple access, FDMA, technology and/or for reception based on a second frequency division multiple access technology. The method comprises demodulating and/or decoding of received signaling based on a received reference signaling indication indicating the reference signaling structure used for the received signaling.

Moreover, according to a ninth approach, there is disclosed a radio node for a Radio Access Network. The radio node may be a terminal or a network node, in particular a terminal according to the first and/or second and/or fourth approach, or a network node according to the fifth and/or sixth and/or seventh and/or eight approach. The radio node is adapted for, and/or comprises a first communication module for, communication based on a first frequency division multiple access, FDMA, technology. The radio node may alternatively or additionally be adapted for, and/or comprise a second communication module for, communication based on a second frequency division multiple access technology. The radio node is adapted for, and/or may comprise a configuring module for, configuring another radio node with a structure for reference signaling which is a comb structure corresponding to communication based on the first FDMA technology or the second FDMA technology.

A method for operating a radio node in a Radio Access Network is proposed in the context of this approach, which may be a method for operating a radio node as described herein. In particular, the method may be a method according to the first and/or second and/or third and/or fourth approach, or a method according to the fifth and/or sixth and/or seventh and/or eight approach. The radio node is adapted for communication based on a first frequency division multiple access, FDMA, technology and/or for communication based on a second frequency division multiple access technology. The method comprises configuring another radio node with a structure for reference signaling which is a comb structure corresponding to communication based on the first FDMA technology or the second FDMA technology.

A radio node, in particular the other radio node, may be a terminal or a network node.

There is also disclosed a program product comprising instructions causing control circuitry to control and/or perform any one of the methods disclosed herein, in particular if executed on and/or by the control circuitry.

Moreover, there is disclosed a carrier medium arrangement carrying and/or storing a program product as described herein, and/or instructions causing control circuitry to control and/or perform any one of the methods disclosed herein, in particular if executed on and/or by the control circuitry.

There may generally be considered a radio access network system comprising any one of the terminals described herein and/or and any one of the network nodes described herein.

In general, there may be considered a radio access network system, the system being adapted for uplink and/or sidelink transmission based on a first frequency division multiple access technology, and for uplink and/or sidelink transmission based on a second frequency division multiple access technology. For transmission based on either of the first or second frequency division multiple access technology, reference signaling utilising a comb structure is used. The uplink and/or sidelink transmission may be transmitted by one or more terminals of the system, which may be any of the terminals described herein.

Generally, reception based on the first FDMA may be independent and/or separate and/or at different times than reception based on the second FDMA (and/or, reception may be selectively based on the first or second FDMA), or it may be simultaneously.

Transmitting based on different FDMA technologies may be at different points in time (and/or transmitting or communicating may be selectively based on the first or second FDMA). A terminal may select and/or switch, and/or be adapted for selecting and/or switching, and/or comprise a selecting or switching module for selecting and/or switching, between different FDMAs. Such selecting or switching may for example be based on a configuration, e.g. by a radio node, e.g. the network, in particular a network node, or another terminal, and/or based on operational conditions, e.g. based on measurements and/or a load indication and/or a channel quality indication (e.g., a Signal-to-Noise ratio, SNR, and/or a Signal-to-Interference and Noise ratio, SINR, and/or a Signal-to-Interference ratio, SIR).

In some cases, transmission on different FDMAs may be simultaneously, e.g. when using multiple (independent) transmitter circuitries and/or antennas.

Selecting and/or determining a FDMA technology may generally performed based on the data-rate for transmission (e.g., above or below a certain threshold, such that for cases below, the second FDMA is used, and for cases above, the first FDMA is used), and/or the transmission power available, e.g. above or below a certain power threshold, in particular such that for a transmission power available below the power threshold, the second FDMA technology is used, and/or for cases above, the first FDMA technology is used.

Signaling may comprise one or more signals and/or symbols. It may be considered that each signal of signaling covers one resource element (which may be a Resource Element, RE, according to 3GPP standards, e.g. LTEE/NR). Signaling may comprise signaling of data and/or reference signaling. Data may generally comprise user data and/or payload data. Signaling may be associated to specific time-frequency resources, e.g., one or more resource elements and/or subcarrier/s per symbol. In some cases, reference signaling may comprise data signaling, e.g. on resources (e.g., frequency resources) not used for reference signals and/or symbols.

Generally, each signaling comprising reference signals may be considered reference signaling. Signaling, in particular reference signaling, may cover one or more symbol time intervals, in particular one symbol time. It may be considered that signaling covers and/or comprises on symbol of the FDMA used, e.g. one OFDMA symbol or one DFTS-OFDMA symbol. Such signaling may specifically cover a plurality of resource elements or subcarriers for the symbol time/s, in particular for one symbol time.

The number of subcarriers and/or resource elements may be dependent on the bandwidth available for the signaling. Each signaling may be associated to one antenna port and/or antenna configuration, e.g. in a multi-antenna system. A symbol time interval may correspond to the time duration associated and/or allocated for transmission of one or specifically that symbol (which may be a FDMA symbol). A FDMA symbol may comprise a plurality of modulation symbols, which may be allocated and/or distributed over the resource elements associated and/or allocated and/or covered by the FDMA symbol.

Reference signaling may comprise one or more reference signals and/or symbols. It may be considered that reference signaling provides signals and/or symbols enabling a receiver, e.g. a radio node, to determine transmission characteristics of the signaling (e.g., channel quality, and/or SIR/SINR/SNR and/or transmission power) and/or to demodulate and/or decode signaling. Such signaling to be demodulated and/or decoded may be associated to the reference signaling (e.g., following or preceding in time), and/or the reference signaling may be included in the signaling. Reference signals and/or signaling transmitted from a terminal may for example include pilot signal/s and/or sounding signals, e.g. sounding reference signals (e.g., Sounding Reference Signals, SRS, according to 3GPP standards).

A FDMA technology may generally refer to a technology and/or approach and/or method and/or set of rules for providing and/or implementing frequency division multiple access in transmission. It may be considered that for a precoded or spreading FDMA technology, information to be transmitted, in particular data, undergoes a spreading/precoding before being allocated to resource elements, e.g. resource elements of one FDMA symbol and/or associated to the same symbol time interval. However, in the case that no data is to be transmitted in a (FDMA) symbol, and/or in the case of the symbol comprising and/or comprising of reference signaling, no such spreading and/or pre-coding may be necessary and/or may be omitted. In other words, for reference signaling, reference signals may be allocated and/or distributed to resource elements without spreading and/or pre-coding.

Generally, it may be considered that any of the radio nodes (terminals and/or network nodes) discussed herein is adapted for, and/or comprises a determining module for, determining a FDMA technology to be used (e.g., by itself and/or by a node to be configured), and/or which reference signaling structure to use, in particular which comb, and/or whether transmit with data in the comb structure (and/or to include the data into the comb structure). Any of the methods may comprise a corresponding determining.

A reference signaling structure may define the arrangement and/or allocation of reference signals within an FDMA symbol and/or within a plurality of resource elements (and/or subcarriers) associated to one (the same) symbol time interval. The plurality of resource elements and/or subcarriers may be arranged sequentially and/or consecutive and/or continuous in frequency, within a lower and upper frequency boundary (which may be defined by the bandwidth used for transmission of the signaling and/or reference signaling).

The structure may define which resource elements (and/or subcarriers) carry reference signals and/or on which resource elements and/or subcarriers a reference signal is to be transmitted (there may be different or the same reference signals on different resource elements and/or subcarriers). It may be considered that the structure additionally defines which resource elements are empty and/or on which no signal is to be transmitted, and/or on which resource element/s data is transmitted. For a second FDMA technology, there may be no allocation of data and/or data signals on the plurality of resource elements.

A comb structure may generally describe a structure in which for every N-th (N may be an integer) resource element and/or subcarrier a reference signal pattern is repeated. N may be called the width of the comb. Generally, the comb may indicate the periodicity of the pattern inside the frequency range of the reference signaling. The pattern may in particular pertain to one reference signal and/or resource element or subcarrier for transmitting a reference signal, such that the comb may be considered to indicate that on every N-th resource element (in particular, only there) and/or subcarrier there is to be a reference signal, and/or how many resource elements and/or subcarriers are between resource elements and/or subcarriers with reference signals. However, there may be considered variants, in which the pattern represents more than one reference signals. The pattern may also generally represent and/or indicate one or more empty signals and/or one or more data signals (respectively associated resource elements and/or subcarriers).

A comb may comprise two or more, for example at least three or at least four, repetitions of the pattern. The comb may indicate a reference and/or indication, e.g. a resource element and/or subcarrier, which may be related to the upper and/or lower boundary in frequency, regarding the arrangement and/or location in frequency of a first pattern, and/or the relative shift of the pattern and/or comb in frequency. Generally, a comb structure may cover at least part, and/or at least the majority, and/or essentially all or all resource elements and/or subcarriers of the plurality of resource elements and/or subcarriers, and/or the FDMA symbol.

A comb structure may result from combining two comb structures, which may in particular comb structures with pattern comprising only one reference signal. A comb structure may be determined and/or amended before transmission, e.g. based on other reference signaling to be transmitted, e.g. on a different antenna port. In this context, reference signals may be replaced by empty signals to avoid overlap and/or interference. Generally, if the other reference signaling utilises a comb structure as well, a different/new comb (as a combination of combs) may be considered to be determined, e.g. with less dense reference signal distribution and/or a different/wider pattern. Alternatively or additionally, combs may be combined to increase the reference signal density, e.g. by combining combs with different widths, and/or with shifted offsets.

Generally, a comb structure may represent and/or comprise and/or be comprised of any of the combs/comb structures described herein.

BRIEF DESCRIPTION OF THE DRAWINGS

The drawings are provided to illustrate the concepts and approaches described herein and are not intended to limit their scope unless explicitly stated otherwise.

The drawings comprise:

FIGS. 1 to 7 generally show examples of reference signaling covering and/or in a (first) FDMA symbol of a slot having reference signals in a comb structure, with following symbols that may be considered to comprise associated signaling, e.g. data. The whole slot may be considered to represent signaling comprising reference signaling. Reference signalings 1 and 2 may respectively pertain to a reference signaling/symbol transmitted on different antenna ports 1 and 2.

DETAILED DESCRIPTION

OFDM is a multi-carrier transmission scheme that enables high performance over frequency selective channels and can easily be integrated with multiple-input multiple-output (MIMO) transmission schemes. It also enables simple high-performing receivers. One drawback of OFDM is its high Peak to Average Power Ratio (PAPR)/Cubic Metric (CM), which leads to inefficient Power Amplifier (PA) utilization and may require power backoff with negative coverage impact. An FDMA may be based on OFDM.

To mitigate the PAPR/CM disadvantage of OFDM, the input to an OFDM modulator can be precoded or spread by a DFT (Discrete Fourier Transform). This results in lower PAPR/CM of the waveform generated by the OFDM modulator. The combination of DFT-precoder and OFDM modulation is called DFTS-OFDM (sometimes also referred to as Single-Carrier FDMA). This scheme or technology can enable higher PA utilization and less PA backup. Drawback of DFTS-OFDM is worse performance over frequency selective channels and more complicated receivers.

The combination discussed for NR UL is to use OFDM/A for high data-rate transmission while DFTS-OFDM/A for low-data rate transmission for power-limited users. Accordingly, OFDM, respectively OFDMA based on OFDM, may be considered as an example of a first and/or multi-carrier FDMA technology, whereas DFTS-OFDM, respectively DFTS-OFDMA may be considered as a second and/or spreading FDMA technology.

Figure 1:
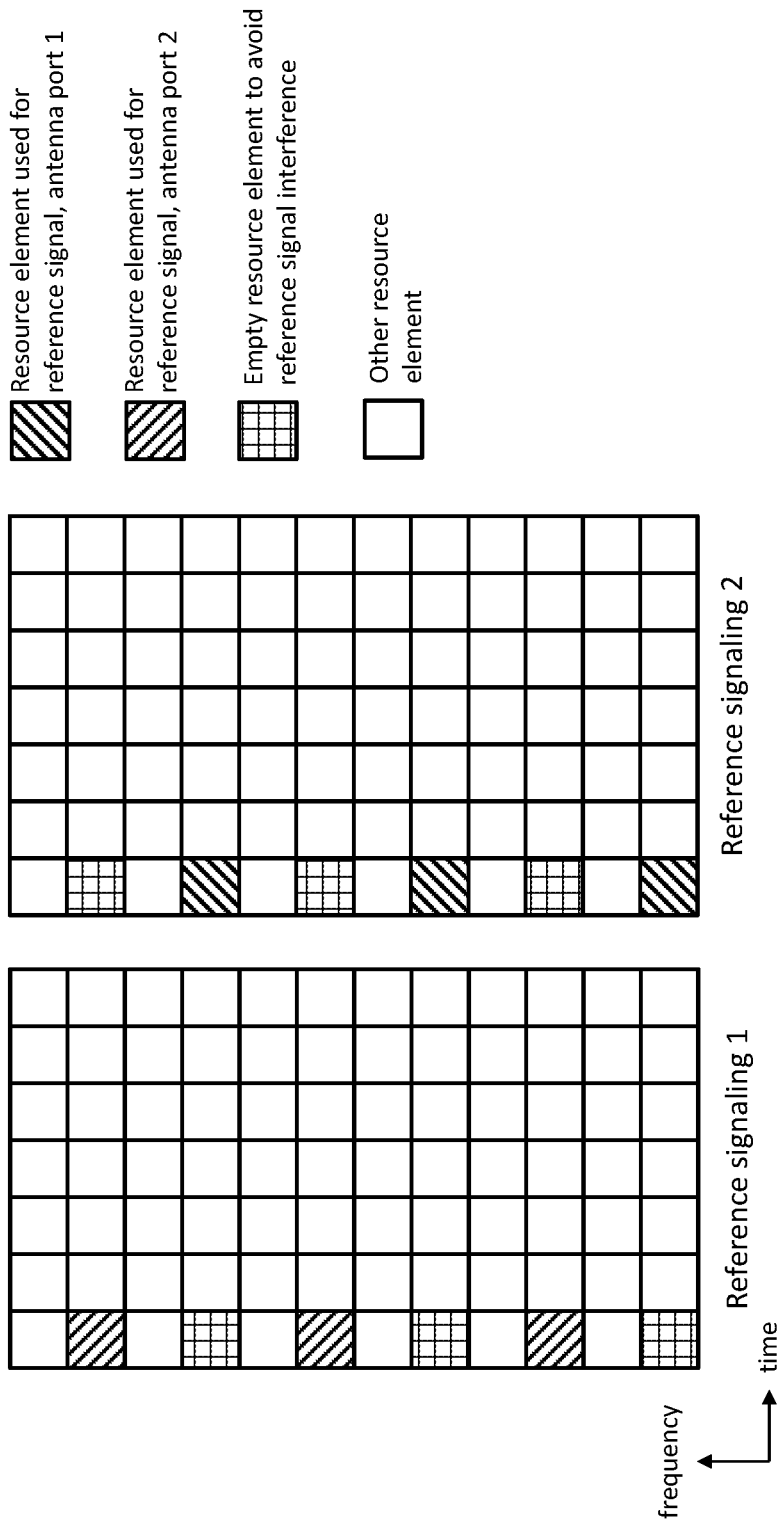
FIG. 1, showing exemplary signaling with comb structures.

Reference signaling is used in communication systems to enable the receiver to estimate communication channel and by that enable coherent demodulation of the transmission. One example for reference signal pattern representing a comb for OFDM in downlink is depicted in FIG. 1. The figure shows a transmission slot consisting of seven symbols (in time-frequency), where the first symbol contains reference signal. Each row represents an OFDM symbol covering one symbol time length and a plurality of subcarriers, in this case 12 (representing 12 resource elements). It may be considered to use such comb for uplink.

For the reference signaling, a sequence is mapped to every N-th subcarrier (a comb, in the shown example N=4) of the OFDM grid. Different combs can be generated by using different shifts of the combs, i.e. with a comb pattern (width) covering M subcarriers, M different combs can be generated. In the example of FIG. 1, combs for two reference signals having the same width N and with patterns covering N subcarriers are shown.

Sequences (of signals) mapped to different combs may generate orthogonal reference signals. For example, in a MIMO scheme which requires multiple orthogonal reference signals, each reference signal can be mapped to its own comb. If more reference signals are needed than combs are available, combs can be combined with other techniques, e.g., Code Domain Multiplexing (CDM) or Orthogonal Cover Codes (OCC). Resource elements occupied by a comb are typically left empty on other antenna ports to avoid interference (exception is the case where the same comb is reused and multiple reference signals are mapped to the same comb using CDM or OCC). In 3GPP terminology, the term antenna port is widely used. The channel properties of the channel over which a symbol is transmitted using an antenna port can be inferred from the channel over which a reference signaling is transmitted using the same antenna port. In other words, a data transmission and a reference signaling transmitted from the same antenna port experience the same channel and the data transmission can therefore be demodulated using a channel estimate obtained from the reference signal transmission. The concept of antenna ports is important in the context of MIMO, each MIMO layer (including the corresponding reference signal) is transmitted from a separate antenna port.

Depending on the sequence mapped to a comb the waveform obtained after OFDM modulation may have low PAPR/CM or not. In LTE DL (downlink), a QPSK sequence may be mapped to the resource elements of a comb which results in a high-PAPR/CM waveform at the output of the modulator. In LTE DL, unused resource elements (combs) are used for data transmission, and thus the generated waveform at the output of the OFDM modulator has high PAPR/CM, irrespective if the reference signal has high or low PAPR/CM. As explained above, resource elements that are used on one antenna port for reference signals may be left empty even on other antenna ports and are not used for data.

In LTE UL (an "extreme" comb with width N=1 is used where every subcarrier within an allocation is used for reference signals) and for sounding (with comb width N=2) Zadoff-Chu sequences (or more general truncated or extended Zadoff-Chu sequences if a true Zadoff-Chu sequence length does not match the required length; or computer-optimized sequences) are mapped to comb subcarriers which are transmitted by the OFDM modulator. The resulting waveform has low PAPR/CM. In LTE UL (both sounding and regular UL reference signals) signals within one antenna port are not frequency multiplexed enabling a low PAPR/CM.

In LTE the reference signaling design for DFTS-OFDM/A(UL) and OFDM/A(DL) are very different. Using reference signals similar to LTE DL (OFDM) for OFDM/A NR UL and reference signals similar to LTE UL (DFTS-OFDM) for DFTS-OFDM/A NR UL would lead to very different UL designs and be a further step in making DL and UL different. Consequences e.g. would be very different channel estimation algorithms and thus different implementations.

It is proposed to have comb-based reference signal structures for both OFDM/A and DFTS-OFDM based NR UL. For the OFDM-based solution unused combs can be used for data since the OFDM/A waveform has anyway high PAPR/CM. For DFTS-OFDM/A based UL on the other hand—where low PAPR/CM is important—unused combs in the reference signaling symbol are not used for data since this would increase the PAPR/CM.

The approaches are outlined for OFDM/A and DFTS-OFDM/A in UL. However, they also apply if OFDM/A is replaced by a multicarrier transmission technology or scheme (such as FBMC) and DFTS-OFDM/A by precoded multicarrier transmission scheme (such as filterbank-precoded FBMC). It also applies to any link that has multiple transmission schemes, e.g. any terminal or UE transmissions (such as sidelinks) and not only UL.

A common reference signaling structure or pattern can be used for OFDM-based and DFTS-OFDM/A based UL which enables communalities between these two modes. Furthermore, if also DL reference signalings are similar, this enables even communalities between DL and UL. Communalities simplify implementation since many building blocks can be reused.

The large similarity between the UL modes enables simple switching between the two UL modes, e.g. based on an indicator in the Downlink Control Information (DCI) scheduling the uplink.

Figure 2:
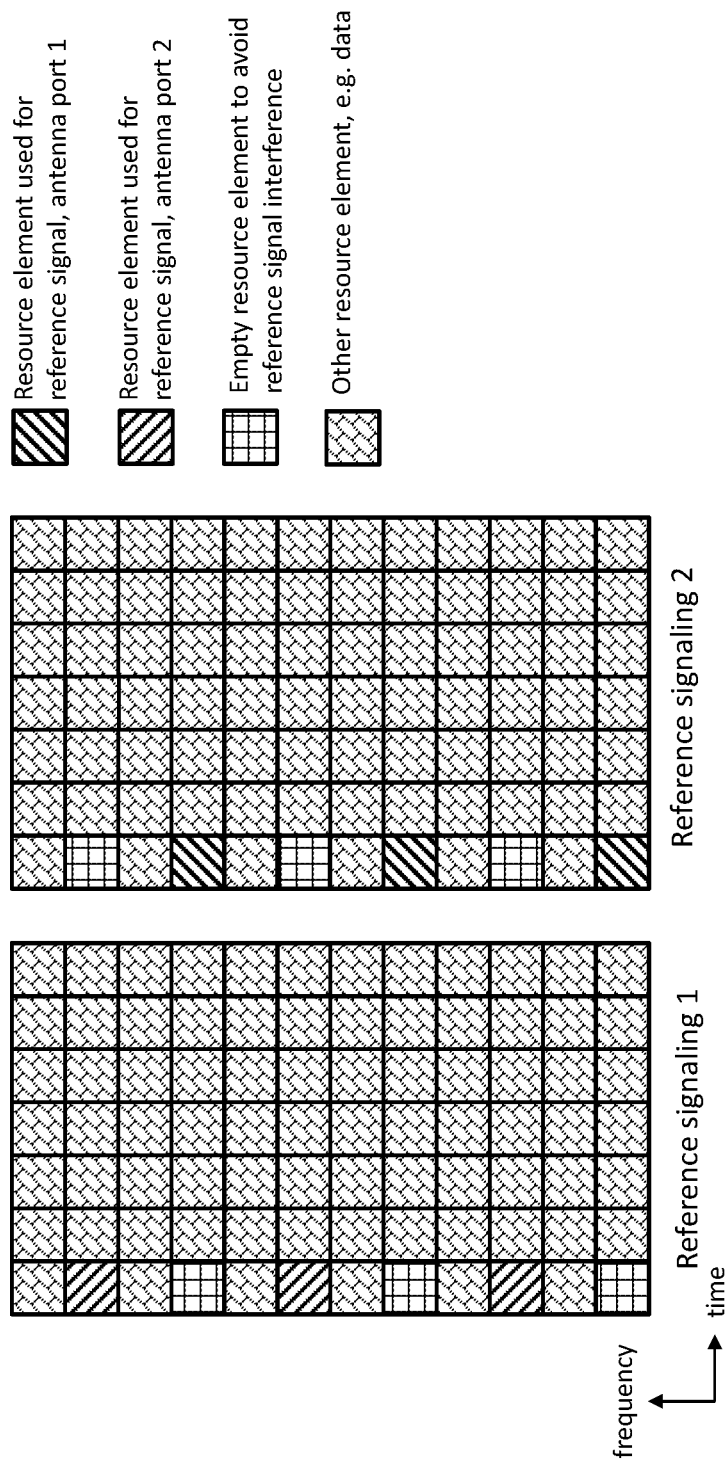
FIG. 2, showing exemplary signaling with comb structures.

OFDM-based UL transmission scheme may use the comb-based reference signaling structure are depicted in FIG. 2. In a MIMO transmission scheme, multiple orthogonal reference signalings are created by mapping reference signals to different combs.

Since the OFDM/A waveform of data anyway has high PAPR/CM it is not so important to have low PAPR/CM for the reference signaling symbols, therefore (at least some) resource elements (combs) in the OFDM/A symbol not carrying reference signals are used for data. Resource elements used by reference signals are typically left empty on all other antenna ports (except if the same resource elements are used in a CDM/OCC fashion to create additional reference signals). The sequence mapped to the reference signal resource elements can be e.g. based on QPSK symbols, Zadoff-Chu, etc (the sequence does not have to result in a low-PAPR/CM reference signaling).

On the other hand, if DFTS-OFDM/A is used, low PAPR/CM is important. The reference signal pattern or comb depicted in FIG. 3 may be used for this FDMA technology. However, since low PAPR/CM is important, no data are mapped on empty resource elements (combs) in the OFDM/A symbol carrying reference signals. The sequence mapped to the reference signal resource element results in a low-PAPR/CM reference signaling, candidates could be Zadoff-Chu (true or truncated or extended) sequences or computer-optimized sequences.

FIG. 2 shows the time-frequency plane of OFDM/A and DFTS-OFDM/A. In the time domain it shows 7 symbols, in the frequency-domain 12 subcarriers. The reference signaling could in frequency domain extend over the same frequency portion as the data or across a larger portion. The figures show the mapping for two different reference signalings, each reference signaling is transmitted from one antenna port.

Figure 3:
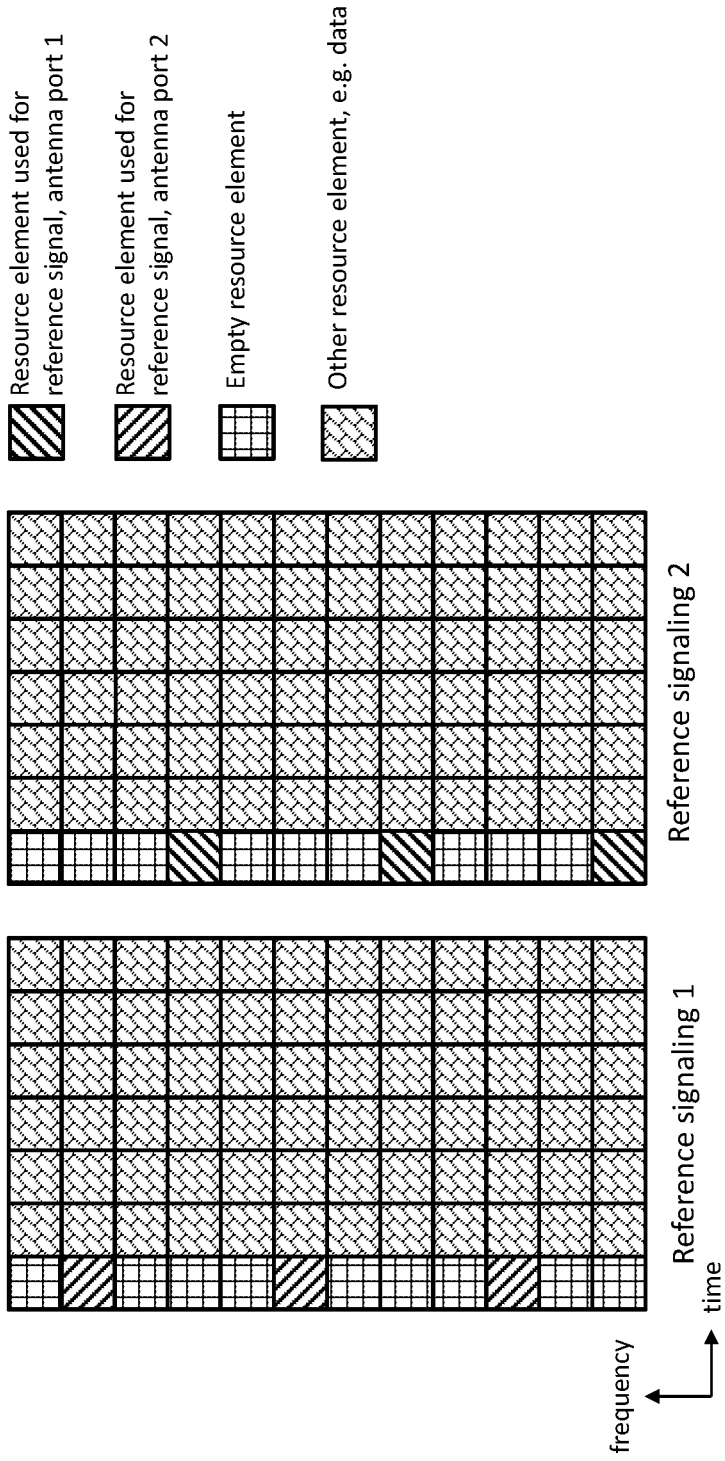
FIG. 3, showing exemplary signaling with comb structures.

In particular, FIG. 2 shows, for OFDMA, that resource elements in the reference signaling OFDM/A symbol carry also data. FIG. 3 shows, for DFTS-OFDM, that no data are mapped to the OFDM/A symbol carrying reference signals, resource elements not used for reference signals are left empty.

Figure 4:
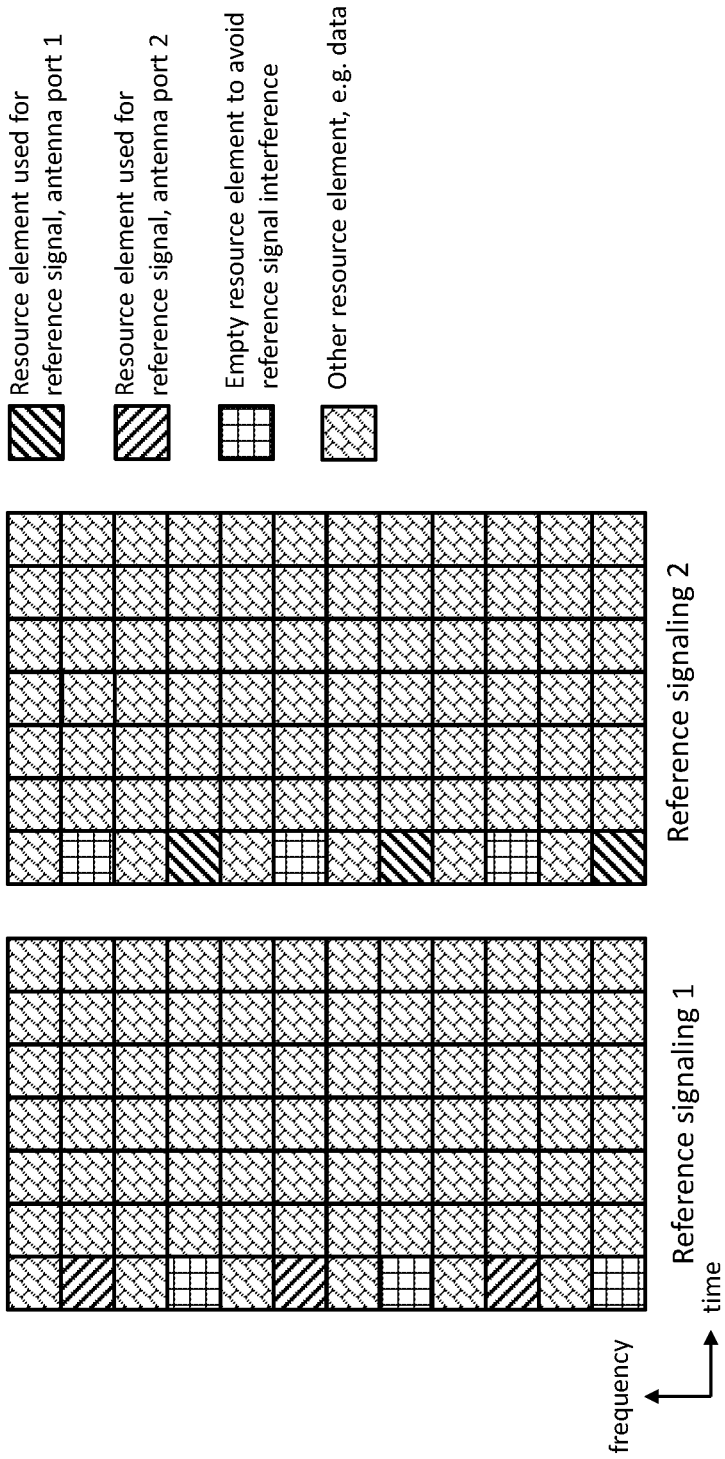
FIG. 4, showing exemplary signaling with comb structures.
Figure 5:
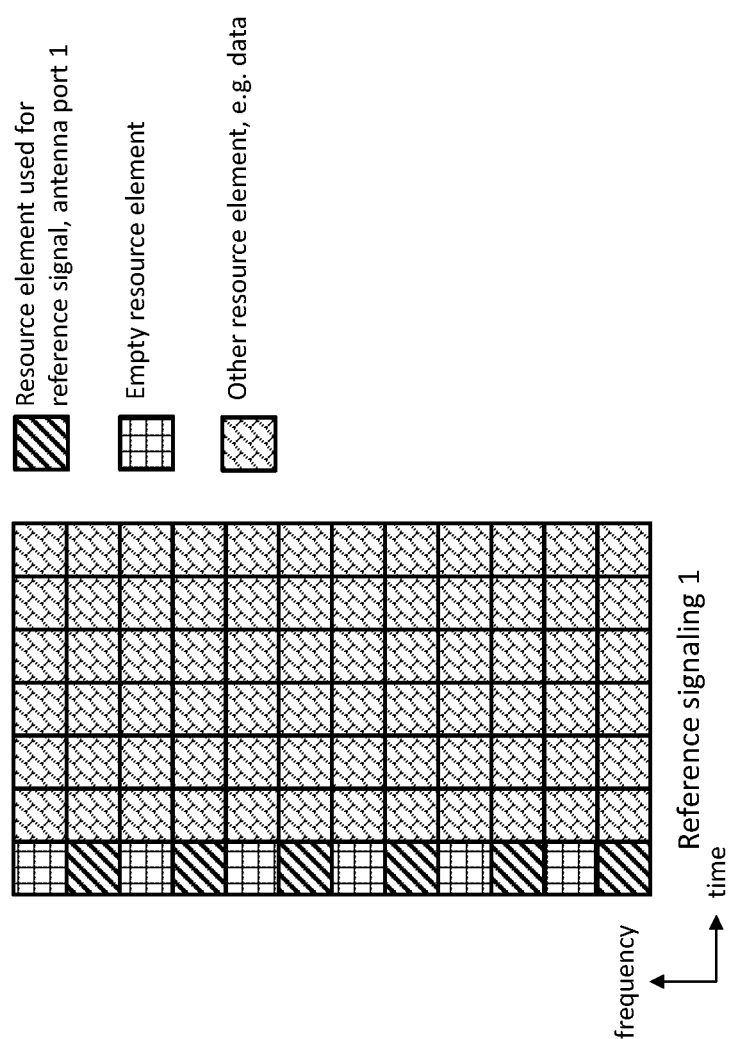
FIG. 5, showing exemplary signaling with comb structures.

DFTS-OFDM/A is typically used for UEs in poor SNR conditions. Channel estimation may therefore require reference signals with higher densities and/or power. One possibility is to power boost the reference signaling transmitted in the first OFDM/A symbol, but not increasing the number of used resource elements. Alternatively, or in addition, one reference signaling can be mapped to the resource elements of multiple combs creating a reference signaling with higher density, as shown in FIGS. 4 and 5. FIG. 4 shows the mapping for two reference signaling in OFDM. FIG. 5 shows how two combs are combined into one comb of higher density to create one dense reference signaling.

FIG. 4 in particular shows, for OFDM/A, that resource elements in the reference signaling OFDM/A symbol carry also data (as in FIG. 2). FIG. 5 shows, for DFTS-OFDM/A, that no data are mapped to the OFDM/A symbol carrying reference signaling or symbol/s, resource elements not used for reference signals may be left empty. The single reference signaling is twice as dense as each reference signaling or symbol in the OFDM/A case.

For Multi-user MIMO between OFDM/A and DFTS-OFDM/A (as for regular Single-user MIMO, but in this case transmission schemes would not be mixed) orthogonal reference signalings are important. One possibility is to assign different combs. If the same comb is assigned to an antenna port used for OFDM/A and an antenna port used for DFTS-OFDM/A orthogonal reference signalings can be created by means of CDM. Both reference signalings have the same density (same comb), if DFTS-OFDM/A requires higher reference signaling power boosting can be applied.

Figure 6:
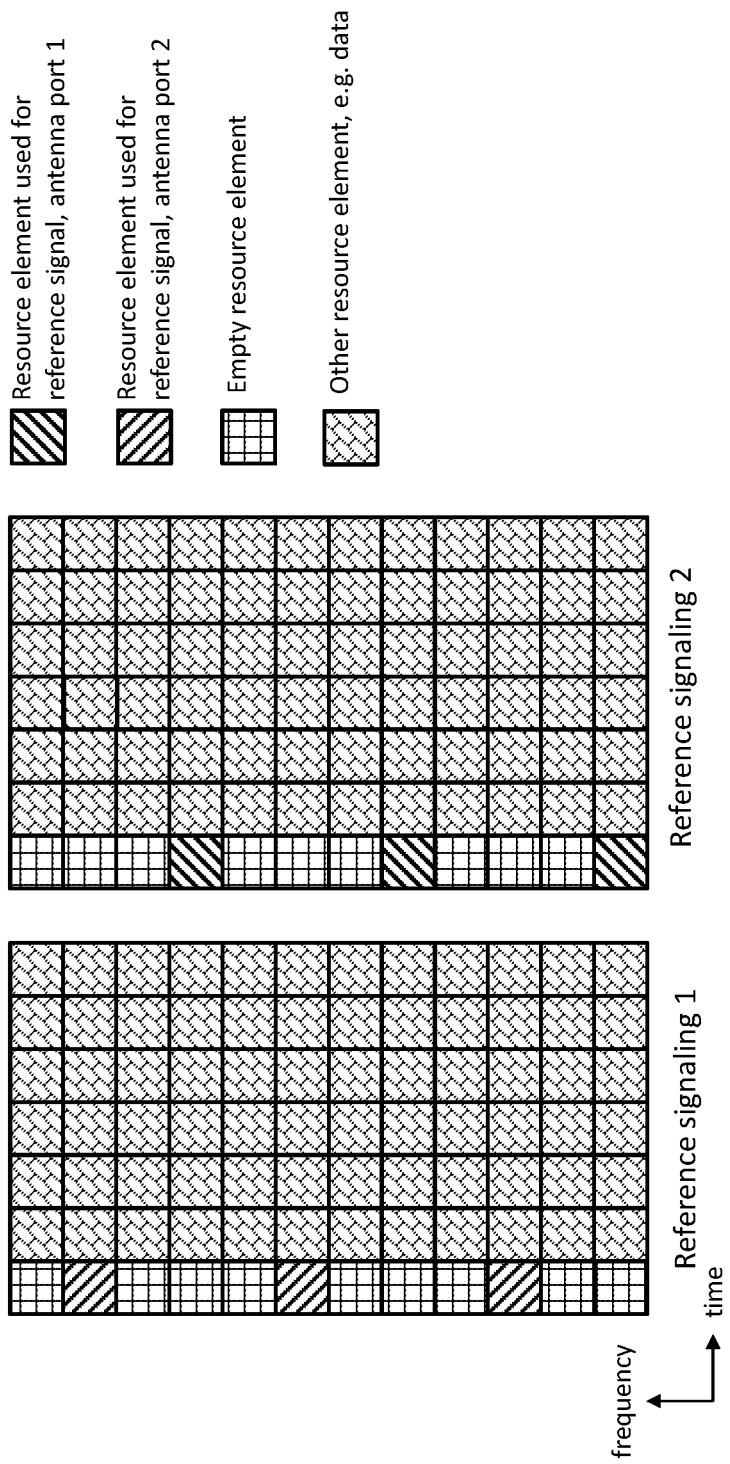
FIG. 6, showing exemplary signaling with comb structures.
Figure 7:
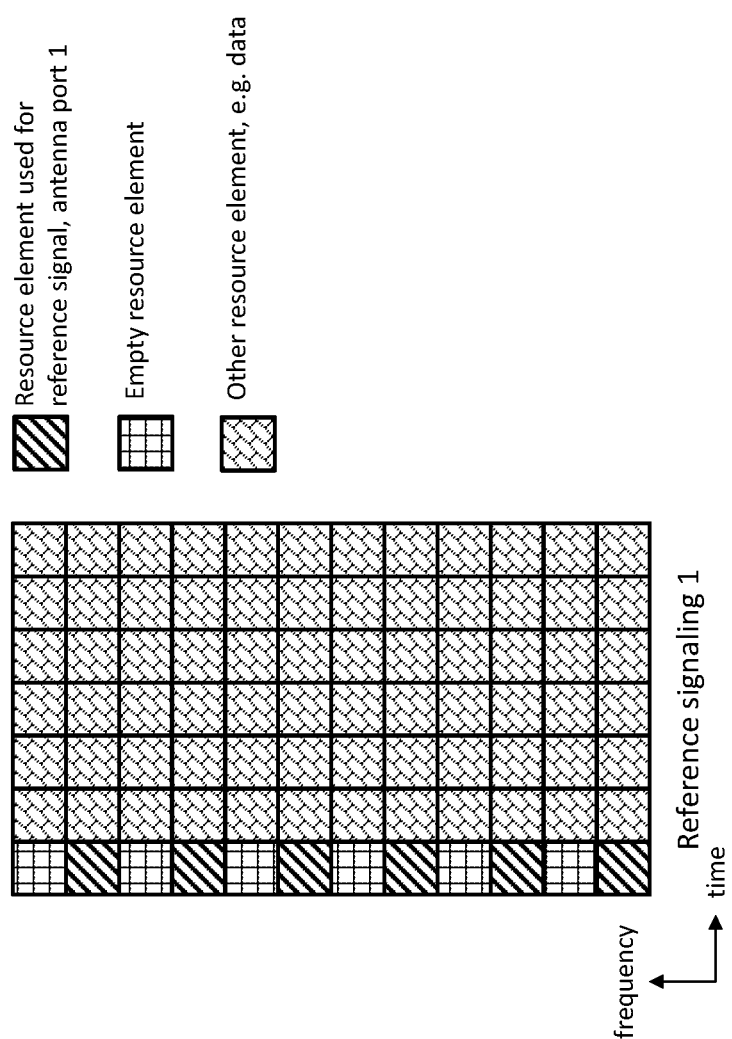
FIG. 7, showing exemplary signaling with comb structures.

A slightly different variant may comprise that for OFDM/A and DFTS-OFDM/A, the number of combs (and/or number of resource elements and/or density of resource elements) mapped to a reference signaling and/or symbol differs, typically the reference signaling for DFTS-OFDM/A may have a higher density, e.g. to accommodate that DFTS-OFDM/A may operate in lower SNR, see FIGS. 6 and 7. Resource elements not used for reference signaling transmission in a symbol or reference signaling in the OFDM/A case can be used for data (as shown in FIG. 4) or are left empty (as shown in FIG. 6).

FIG. 7 shows reference signaling for the DFTS-OFDM/A case (bottom), which has a higher density than each reference signaling for OFDM/A as shown in FIG. 6. Resource elements of the reference signal carrying OFDM/A symbol not used for reference signals are left empty in both cases.

With the proposed design for reference signaling, OFDM-based UL and DFTS-OFDM-UL become very similar. This enables very simple switching between these two modes, e.g. based on an indicator (e.g. bit) in the Downlink Control Information (DCI) scheduling the uplink, which may be considered a reference signaling indication.

The reference signaling structure or reference signal pattern/s for OFDM-based UL and DFTS-OFDM-based UL are based on similar structures, in particular a comb structure. For OFDM, resource elements not used for reference signal transmission (in the OFDM/A symbol carrying the reference signal) may be used for data, while they may be left empty for the DFTS-OFDM/A case.

Figure 8:
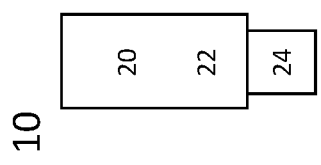
FIG. 8, showing an exemplary terminal.

FIG. 8 schematically shows a terminal 10, which may be implemented as a user equipment. Terminal 10 comprises control circuitry 20, which may comprise a controller connected to a memory. Any module of the terminal, e.g. first and/or second transmitting module and/or first and/or second communication module may be implemented in and/or executable by, the control circuitry 20, in particular as module in the controller, e.g. in software and/or hardware and/or firmware. Terminal 10 also comprises radio circuitry 22 providing receiving and transmitting or transceiving functionality, the radio circuitry 22 connected or connectable to the control circuitry, e.g. to be controllable by the control circuitry and/or for signaling exchange. An antenna circuitry 24 of the terminal 10 is connected or connectable to the radio circuitry 22 to collect or send and/or amplify signals. Radio circuitry 22 and the control circuitry 20 controlling it are configured for cellular communication with a network. The terminal 10 may be adapted to carry out any of the methods for operating a terminal disclosed herein; in particular, it may comprise corresponding circuitry, e.g. control circuitry. In particular, the circuitry of the terminal 10 may be adapted for (e.g., selectively or switchably) communication and/or transmission based on a first FDMA technology and/or transmission on a second FDMA technology (e.g., selectively and/or simultaneously). In particular, the antenna circuitry may comprise and/or be connected or connectable to a multi-antenna array.

Figure 9:
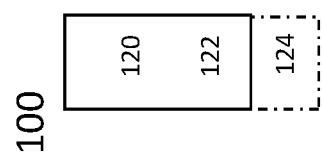
FIG. 9, showing an exemplary network node.

FIG. 9 schematically show a network node 100, like base station or relay station or any radio access node, which in particular may be an eNodeB or similar for NR. Network node 100 comprises control circuitry 120, which may comprise a controller connected to a memory. Any module, e.g. first and/or second receiving module and/or processing module and/or configuring module of the network node 100 may be implemented in and/or executable by the control circuitry 120, e.g. in software and/or hardware and/or firmware. The control circuitry is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. control circuitry. The antenna circuitry may be connected to and/or comprise an antenna array. The network node 100, respectively its circuitry, may be adapted to for communicating using a first FDMA and a second FDMA (e.g., selectively and/or simultaneously). In particular, the antenna circuitry may comprise and/or be connected or connectable to a multi-antenna array.

A Radio Access Network (RAN) may be any kind of cellular and/or wireless radio network, which may be connected or connectable to a core network. The approaches described herein are particularly suitable for a 5G network, e.g. advanced LTE/LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. Transmitting in downlink may pertain to transmission from the network or network node to the terminal. Transmitting in uplink may pertain to transmission from the terminal to the network or network node.

A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A terminal may be implemented as a user equipment. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or a user equipment is adapted for one or more RATs (radio Access Technologies) and/or RANs (Radio Access Networks), in particular NR. A terminal or user equipment may generally be proximity services (ProSe) enabled, which may mean it is D2D capable or enabled, respectively, that it may perform sidelink communication. It may be considered that a terminal or user equipment comprises radio circuitry and/control circuitry for wireless communication. Radio circuitry may comprise for example a receiver device and/or transmitter device and/or transceiver device. Control circuitry may include one or more controllers, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for NR. Reference signaling in the uplink may be associated to a terminal, e.g. SRS (Sounding Reference Signaling) and/or pilot signaling.

Configuring (e.g., with or for a configuration) a device like a terminal or network node may comprise bringing the device into a state in accordance with the configuration. A device may generally configure itself, e.g. by adapting a configuration. Configuring a terminal, e.g. by a network node, may comprise transmitting a configuration or configuration data indicating a configuration to the terminal, and/or instructing the terminal, e.g. via transmission of configuration data, to adapt the configuration configured.

A configuration may in particular pertain to measurement reporting, e.g. to a CSI process. Measurement reporting may generally pertain to specific signaling (or an associated port), which may be indicated or configured to the terminal by the network or network node, e.g. by transmitting corresponding configuration data. A configuration may in particular pertain to a reference signaling structure and/or a FDMA technology to be used for transmission.

Resources or communication resources or radio resources may generally be frequency and/or time resources (which may be called time-frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information.

Communication may generally pertain to transmission and/or reception. Any FDMA technology may be related to, and/or based on, an associated frequency division multiplexing, FDM, technology. In particular, any FDMA may comprise a modulation and/or demodulation (in reception) based on the associated FDM.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or New Radio (NR) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

What is claimed is:

1. A user equipment (UE) for a New Radio (NR) radio access network, the user equipment comprising:
   radio circuitry; and
   control circuitry operatively connected to the radio circuitry and configured to control the radio circuitry to transmit signaling using orthogonal frequency division multiple access (OFDMA), said signaling comprising transmitting reference signaling having a comb structure, data being transmitted inside the comb structure of the reference signaling.

2. The UE of claim 1, wherein the comb structure represents a pattern in frequency space.

3. The UE of claim 1, wherein the comb structure indicates subcarriers for transmission of reference signaling and subcarriers empty of reference signaling, wherein subcarriers inside the comb structure empty of reference signaling are for transmission of data.

4. The UE of claim 1, wherein the reference signaling is demodulation reference signaling.

5. The UE of claim 1, wherein the control circuitry is further configured to control the radio circuitry to transmit signaling using Discrete Fourier Transform Spread OFDMA (DFTS-OFDMA), wherein the transmission of signaling using DFTS-OFDMA comprises transmission of reference signaling having a comb structure without data inside the comb structure.

6. The UE of claim 1, wherein the comb structure is based on a combination of comb substructures.

7. A method of operating a user equipment in a New Radio (NR) radio access network, the method comprising:

transmitting signaling using orthogonal frequency division multiple access (OFDMA), said transmitting of signaling using OFDMA comprising transmitting reference signaling having a comb structure, data being transmitted inside the comb structure of the reference signaling.

8. The method of claim 7, wherein the comb structure represents a pattern in frequency space.

9. The method of claim 7, wherein the comb structure indicates subcarriers for transmission of reference signaling and subcarriers empty of reference signaling, wherein subcarriers inside the comb structure empty of reference signaling are for transmission of data.

10. The method of claim 7, wherein the reference signaling is demodulation reference signaling.

11. The method of claim 7, the method comprising transmitting signaling either using Discrete Fourier Transform Spread OFDMA, DFTS-OFDMA or OFDMA, wherein transmitting signaling using DFTS-OFDMA comprises transmitting reference signaling having a comb structure without data inside the comb structure.

12. The method of claim 7, wherein the comb structure is based on a combination of comb substructures.

13. A network node for a New Radio (NR) Radio Access Network, the network node comprising:

radio circuitry; and control circuitry operatively connected to the radio circuitry and configured to control the radio circuitry to receive signaling based on Orthogonal Frequency Division Multiple Access (OFDMA), wherein receiving said signaling comprises at least one of demodulating and decoding received signaling based on received reference signaling having a comb structure and data being inside the comb structure of the reference signaling.

14. The network node of claim 13, wherein the comb structure represents a pattern in frequency space.

15. The network node of claim 13, wherein the comb structure indicates subcarriers for reference signaling and subcarriers empty of reference signaling, wherein subcarriers inside the comb structure empty of reference signaling are for data.

16. The network node of claim 13, wherein the reference signaling is demodulation reference signaling.

17. The network node of claim 13, wherein the control circuitry is further configured to control the radio circuitry to receive signaling using Discrete Fourier Transform Spread OFDMA (DFTS-OFDMA), wherein reception of signaling using DFTS-OFDMA comprises at least one of demodulating and decoding received signaling based on received reference signaling having a comb structure without data inside the comb structure.

18. The network node of claim 13, wherein the comb structure is based on a combination of comb substructures.

* * * * *